JACKSON & PUSEY.
Cartridge.

No. 50,592.

Patented Oct 24, 1865

Witnesses.
Jms Lenk
P.T. Dodge

Inventors,
C. Jackson &
J.T. Pusey.
By H.H. Dodge
Attorney

UNITED STATES PATENT OFFICE.

CHARLES JACKSON AND J. G. PUSEY, OF PROVIDENCE, R. I.

IMPROVEMENT IN PRIMING METALLIC CARTRIDGES.

Specification forming part of Letters Patent No. 50,592, dated October 24, 1865.

*To all whom it may concern:*

Be it known that we, CHARLES JACKSON and J. G. PUSEY, of Providence, in the county of Providence and State of Rhode Island, have invented certain new and useful Improvements in Metallic Cartridges; and we hereby declare that the following is a clear, full, and exact description thereof, reference being had to the accompanying drawings, making part of this specification, and to the letters of reference marked thereon—

Figure 1:
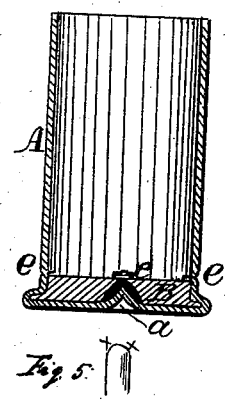
Figure 2:
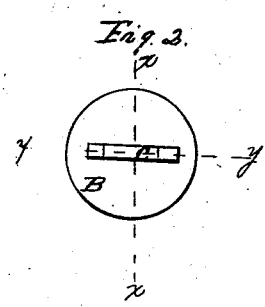
Figure 3:
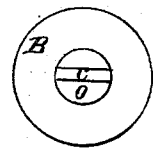

Figure 1 being a longitudinal section of our improved cartridge-case, taken in the line of $x\ x$ of Fig. 2. Fig. 2 is a top-plan view of the metallic disk used as an anvil. Fig. 3 is a face view of the reverse side of said disk; and Fig. 4 a cross-section of the same taken in the line $y\ y$ of Fig. 2.

The nature of our invention consists in a peculiar manner of constructing a metallic cartridge, in which the fulminate is located at the center of the base, usually known as a central-fire cartridge.

To enable others skilled in the art to construct and use our invention, we will proceed to describe it.

A represents a copper case, which is constructed in the usual manner, except at the base, where, as shown in Fig. 1, an indentation is made at its center, by which a conical point, $a$, is raised on the interior surface of the base. It will be observed that the sides within the case of this conical point $a$ are made concave, instead of on a straight line, from its base to its apex or point, for a purpose to be hereinafter explained.

B represents a metallic disk of suitable diameter to fit within the case A. This disk, which is to serve the purpose of an anvil to receive the blow of the hammer, has a conical recess, $o$, Figs. 3 and 4, bored in its under side, but the sides of this recess, instead of forming a straight line from top to bottom, are also made concave, as clearly shown in Figs. 1 and 4.

Figure 4:

The disk then has a slot, $c$, cut in its upper face, as shown in Figs. 2 and 4. This slot is of a curved form, as shown in Fig. 4, and is cut of such a depth as to reach nearly through the body of the disk B, and, being centrally located, passes transversely through the conical recess $o$.

The disk B, being thus prepared, is dropped into the case A, where it is firmly secured in close contact with the plane portion of the base by the indentations $e$ made in the copper case A at the upper edge of B, as shown in Fig. 1.

It will thus be seen that when the disk B is thus located in the bottom of the case A, the point $a$ of the case enters the recess $o$ on the under side of the disk, and that, owing to the fact that the opposing walls of the point $a$ and of the recess $o$ are both made concave in opposite directions, there is left surrounding the point $a$ a space which in its cross-section is elliptical in form, as shown in Fig. 1.

Into the space thus formed the fulminate is deposited, through the slot $c$, from above, the fulminate being prepared in a semi-fluid condition for that purpose. In filling in the fulminate the slot $c$ is filled nearly or quite full, so that as it decreases in bulk by drying the annular space surrounding the point $a$ will be certain to be kept perfectly filled with the fulminate, the cartridges being set on end when the fulminate is put in, so that it will be sure to settle down into the space prepared for it.

In this manner we construct a cartridge that is fired at the center, is perfectly reliable, and that is much safer than the ordinary kinds, as no fulminate can be deposited upon the base or the flange except in the central concavity, where it cannot be hit in handling the cartridges.

In using this cartridge the striking part, the hammer, should be made round, as shown in Fig. 5. When a hammer of this form is used it will be observed that as it enters the recess in the base of the cartridge the rounded surfaces at $x\ x$ will impinge against the convex surfaces of the copper, and imparting the force of its blow thereto at an angle of about forty-five degrees, will be sure to compress and ignite the fulminate lying between the sides of the point $a$ and the wall of the disk surrounding the recess $o$.

Having thus fully described our invention, what we claim is—

A cartridge composed of the case A, provided with the hollow conical point $a$, in combination with the disk B, provided with the recess $o$ and slot $c$, substantially as shown and described.

CHAS. JACKSON.
JOHN G. PUSEY.

Witnesses:
OLIVER P. DAVIS,
CHAS. H. JACKSON.